No. 740,050. PATENTED SEPT. 29, 1903.
R. SHULTS.
GRIDDLE.
APPLICATION FILED OCT. 11, 1902.
NO MODEL.
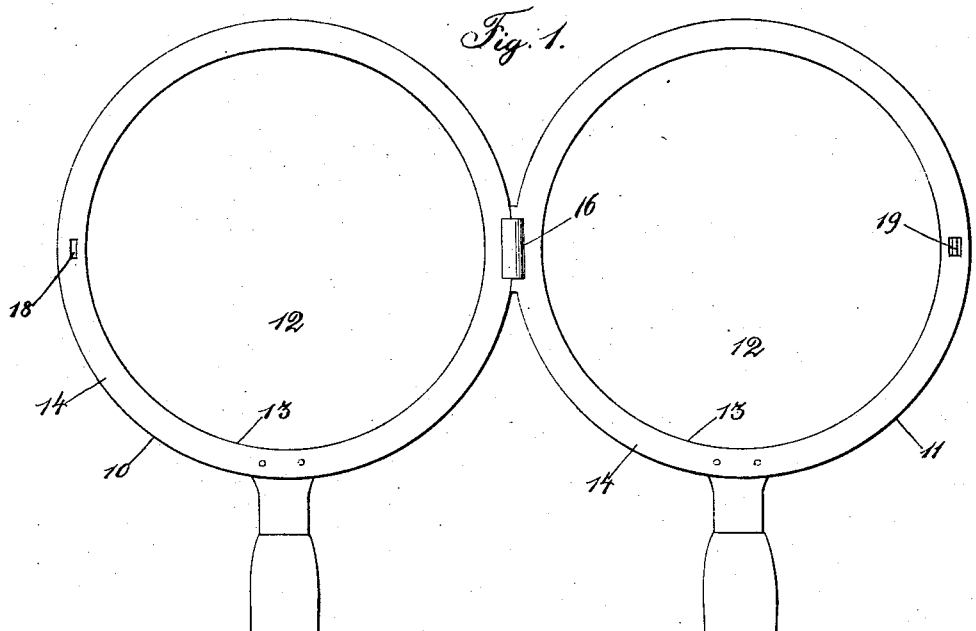
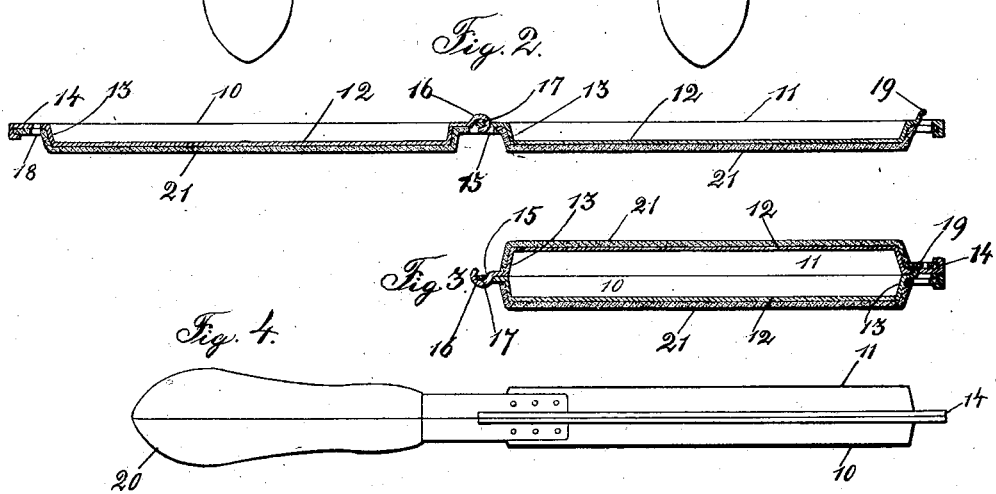
Witnesses:
Henry Manger.
Sidney F. Christy.
Inventor: Rosa Shults.
by Orwig & Lane Atty's.
THE NORRIS PETERS CO., PHOTO-LITHO., WASHINGTON, D. C.

No. 740,050.

Patented September 29, 1903.

UNITED STATES PATENT OFFICE.

ROSA SHULTS, OF DES MOINES, IOWA.

GRIDDLE.

SPECIFICATION forming part of Letters Patent No. 740,050, dated September 29, 1903.

Application filed October 11, 1902. Serial No. 126,960. (No model.)

*To all whom it may concern:*

Be it known that I, ROSA SHULTS, a citizen of the United States, residing at Des Moines, in the county of Polk and State of Iowa, have invented a certain new and useful Griddle, of which the following is a specification.

The objects of my invention are to provide a griddle of simple, durable, and inexpensive construction which can be used without using the ordinary knife or cake-turner for turning the cakes.

A further object is to provide a griddle which will hold the heat and cook the cakes more quickly than the ordinary one-part griddle.

A further object is to provide a two-part griddle which can be taken apart and washed easily on account of the detachable hinge which I have provided.

A further object is to provide a mechanism for locking the edges of the griddle together.

A further object is to provide handles on each part of the griddle in such way that when the two parts of the griddle are folded together the handle will be substantially circular in shape.

A further object is to provide handles on the front edge of the griddle so that these handles will extend from over the top of the stove, and thus not become heated as quickly as if they were allowed to rest on top of the stove.

A further object is to provide an asbestos plate on the outside of each of the parts to prevent them from becoming heated too rapidly and also for holding the heat when the upper part of the griddle is closed on top of the lower part.

A further object is to provide a two-part griddle to which the asbestos covering is attached by simply turning over the edges of the pan to engage this asbestos and in which the locking mechanism is simply stamped out of the metal forming the main portion of the pans, and the hinge mechanism is also stamped out of the same material and all in one piece, and a further object is to provide a griddle which will fry the cakes in a minimum of time, as but little heat will be allowed to escape.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a plan view of the complete griddle with the upper and the lower part away from each other. Fig. 2 is a cross-sectional view of the same. Fig. 3 is a cross-sectional view of the griddle in its closed position, and Fig. 4 is a side elevation of the griddle with the upper and the lower part resting against each other.

Referring to the accompanying drawings, I have used the reference-numeral 10 to indicate the lower portion of the pan and the reference-numeral 11 to indicate the upper portion of the pan, each of said portions 10 and 11 having a bottom portion 12, and the side portions 13 extending substantially at right angles to the bottom portion, said side portions having an extension 14 thereon, said extension being substantially parallel to receive and hold firmly in place the asbestos covering 21, which is placed on the outside of the upper and lower portions 10 and 11. These body portions may be made substantially circular in shape or they may be made in any other form and shape desirable. Through the extension 14 of the portion 11 I have provided an opening 15, designed to receive the hook 16, which is made integral with the extension 14 of the body portion 10, the said opening 15 being provided for receiving the hook 16, and thus allow the hook 16 to move freely around the portion 17, which is at the outer edge of the extension 14 of the upper portion 11. The extensions 14 are substantially flat on their upper surfaces, so that when the upper and lower portions are folded against each other on the hinge portion 17 they will rest firmly against each other, and thus avoid any difficulty in having the edges of the metal sides meeting, and thus prevent anything from getting out of the griddle. On that portion of the extension 14 which is directly opposite the hook 16 I have provided a small opening 18, designed to receive the projection 19, which is on the corresponding part of the portion 11 and is designed to receive it and hold the two parts firmly together when they are in engagement with each other. The upper and lower part, however, can be easily separated by a slight drawing of the upper portion away from the lower, as it is necessary to have a very slight pressure on the extension 19 to force it out of engagement with the sides of the opening 18. Attached to the front of each portion 11 and 12 is a handle 20, which handles are of substantially the same shape and are designed to rest against each other, and on account of these handles being substantially semicircular in cross-section and as the edges which come in contact with each other are substantially parallel with the portion 12 of the pans the upper and lower portions are folded against each other.

In practical use and assuming that the upper and lower portions are extended, as shown in Fig. 1, the person desiring to fry the cakes places them on the bottom portion 12 and when it has become hot by being placed over the fire folds the portion 11 in engagement with the portion 12 and leaves it in this position until the cakes are properly fried on on one side. The operator then turns the entire griddle over quickly, and the cakes fall upon the portion 11, which will then be placed over the fire, and the other side of the cakes is fried. When the cakes are sufficiently fried, the operator opens the griddle by moving the upper and lower portion into the position shown in Fig. 1 and removes the cakes.

The griddle may be used for popping corn or doing work of a similar nature, and the upper and lower portion will be held firmly in position against each other by means of the catch 19 coming in engagement with the sides of the opening 18.

Having thus described my invention, what I claim, and desire to secure by Letters Patent of the United States, is—

1. In a griddle, the combination of an upper and a lower body portion, an asbestos covering on the upper and the lower portion, means for holding the asbestos covering in position relative to said body portion, said lower body portion having an opening in it, a hook integral with the upper body portion designed to fit in said opening, a handle attached to each of the body portions, and a hinge for detachably connecting the upper and lower body portions, substantially as and for the purposes stated.

2. In a griddle, the combination of an upper body portion, a lower body portion detachably hinged to the upper portion having an opening in its exterior edge, a hook attached to the upper portion designed to fit in said opening to hold the upper and lower portions together, an asbestos covering for each of said body portions, means integral with the upper body portion for engaging the asbestos covering upon it, and means integral with the lower body portion for holding in position its asbestos covering, for the purposes stated.

ROSA SHULTS.

Witnesses:
J. RALPH ORWIG,
W. R. LANE.